United States Patent
Allen

[15] 3,701,992
[45] Oct. 31, 1972

[54] SERVOSYSTEM FOR GRAPHICAL RECORDER

[72] Inventor: Daniel E. Allen, Escondido, Calif.

[73] Assignee: Hewlett-Packard Company, Palo Alto, Calif.

[22] Filed: Nov. 1, 1971

[21] Appl. No.: 194,386

[52] U.S. Cl. .................... 346/32, 318/624, 318/635, 346/29
[51] Int. Cl. .............................................. G01d 3/06
[58] Field of Search ....346/29, 31, 32; 318/624, 635, 318/621, 610

[56] References Cited

UNITED STATES PATENTS 3,510,737  5/1970  Brown ................... 318/621 X
3,566,241  2/1971  Ross ..................... 318/610 X Primary Examiner—Joseph W. Hartary
Attorney—Stephen P. Fox

[57] ABSTRACT

An X-Y graphical recorder has a moving pen which is moved along each axis by a position feedback servosystem responsive to digital data from a vector generator. The servosystem includes two parallel connected operational amplifiers, one of which provides an output proportional to analog pen position control signals and the other of which produces a constant level output in response to any pen position control signal greater than the predetermined low value. The outputs from the two servoamplifiers are summed and coupled to a servomotor which drives the pen.

7 Claims, 7 Drawing Figures

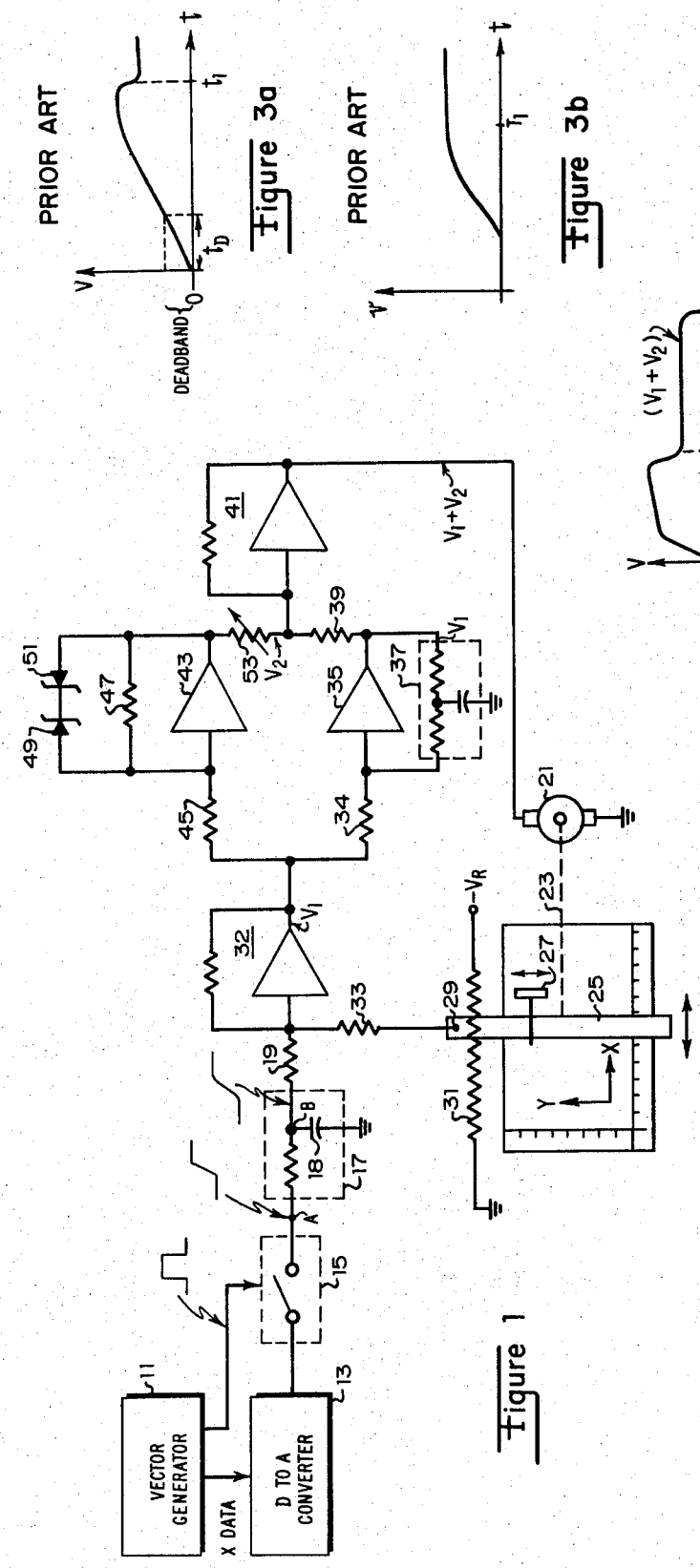
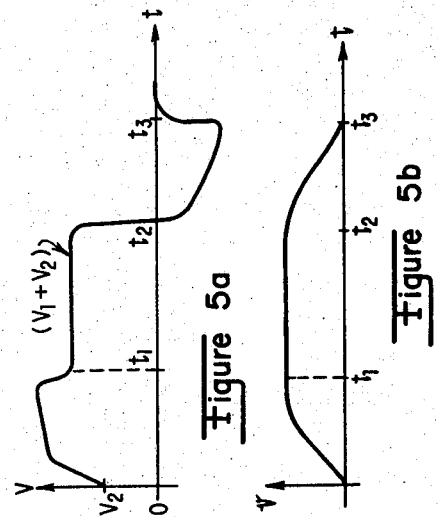
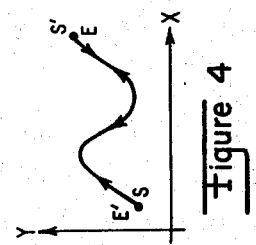
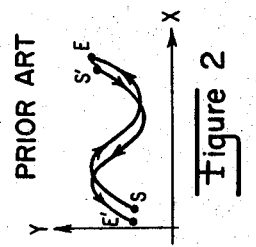

3,701,992

SERVOSYSTEM FOR GRAPHICAL RECORDER

BACKGROUND OF THE INVENTION

In a typical X-Y graphical recorder, there are two pen control channels for the X and Y axes respectively. Each control channel includes a servoamplifier circuit which drives a servomotor in response to analog pen position control signals. The servomotor in turn is mechanically linked to a pen carriage which is linearly positionable along either the X or Y axis. A slide wire potentiometer circuit is also mechanically linked to the pen carriage to provide a pen position feedback signal to the servoamplifier. As the pen carriage is moved to a new position, the feedback signal tends to cancel the pen control signal, and ultimately a point will be reached where the resultant output voltage from the servoamplifier is zero, thereby to cease operation of the servomotor.

A new pen control signal is applied to the servoamplifier and servomotor each time that a new line segment or curve is drawn. Each time a curve is drawn, the servomotor is started from a rest position. When the servomotor is energized by the servoamplifier, actual rotation of the servomotor armature does not begin until a certain time interval after the driving signal is applied to the servomotor from the servoamplifier. This is because the servomotor driving signal must first increase to a magnitude sufficient to overcome the frictional forces of the motor armature and brushes, and the pen carriage and associated mechanical linkage to the motor. The voltage required to overcome the frictional forces is commonly known as deadband. The consequence of deadband is that the line or curve traced by the pen is not an entirely accurate representation of the pen control signal input to the recorder. This is particularly evident in the generation of complex curves wherein portions of the curve are retraced one or more times. The deadband has the effect of slightly off-setting the retrace curve from the original curve, thereby to produce two parallel closely spaced lines, rather than one line as desired.

SUMMARY OF THE INVENTION

The present invention operates to minimize the servoloop deadband in a graphical recorder. This is achieved in a manner which does not interfere with the over-all servoloop gain, so that there is no adverse effect on the balance of the servoloop gains in the control channels for the X and Y axes. According to the illustrated embodiment of the invention, there is provided servoamplifier means which includes first and second operational amplifiers coupled in parallel. The first amplifier produces an output signal proportional to the analog pen control input signal; whereas the second amplifier produces a constant level output signal having a predetermined magnitude which is selected to overcome the frictional forces in the servomotor and associated pen linkage. The outputs from the first and second amplifiers are summed and coupled to drive the servomotor. The second amplifier is operative to produce the constant level output signal in response to the presence of an analog pen control signal of a predetermined low value, thereby to provide a drive signal to the servomotor that initiates rotation of the servomotor armature immediately after a pen control signal is received. With this arrangement, the servomotor is initially energized by the constant level output signal rather than the gradually increasing analog pen control signal. Deadband is minimized because there is no long time interval required for the analog pen control signal to build up to a value sufficient to overcome frictional forces and begin moving the armature and the pen carriage mechanically linked thereto.

BRIEF DESCRIPTION OF THE DRAWINGS

FIG. 1 is a combined schematic and block diagram illustrating a graphical recording system incorporating the present invention.

FIGS. 2 and 3a–b are curves and waveforms illustrating the operation of a typical prior art graphical recorder.

FIGS. 4 and 5a–b are a curve and waveforms illustrating the operation of the system of FIG. 1.

DESCRIPTION OF THE PREFERRED EMBODIMENT

Referring now to FIG. 1, there is shown a vector generator 11 which may be a computer, for example. The vector generator 11 produces blocks of data in sequence, and each block of data represents in digital form a pair of X and Y coordinate positions to which the pen is to be moved on a graph. The two control channels for the X and Y data, respectively, are identical, so only the channel for the X data is shown in FIG. 1 and described herein. Digital data representing an X coordinate position is converted to an analog signal by a digital-to-analog converter 13. The output of converter 13 is fed to a gate controlled switch 15 and thence to a filter and memory-hold circuit 17. In operation, switch 15 is held open while an X coordinate position from vector generator 11 is loaded into the digital-to-analog converter 13. After the output of the converter 13 has stabilized at the corresponding analog signal level, vector generator 11 produces a pulse on the gate control input to switch 15, thereby to transmit the analog signal to circuit 17. The input signal to circuit 17 is essentially a step function having a fast rise time, as shown by the waveform which appears at point A in FIG. 1. The R-C filter in circuit 17 serves to retard the beginning and ending transition points of the analog signal, as shown by the waveform at point B in FIG. 1. The more slowly increasing analog signal drives the servosystem for a recording pen to move the pen to the coordinate position corresponding to the analog signal, as hereinafter described. When a new coordinate position is to be plotted, switch 15 is first opened under control of the vector generator 11 and thereafter new X digital data is fed into the digital-to-analog converter 13. While switch 15 is open, the analog signal corresponding to the preceding X coordinate position is held in memory by the capacitor 18 in the filter and memory-hold circuit 17. Thus, as the graphical plot proceeds from one coordinate to the next, each digital coordinate position is loaded into the digital-to-analog converter 13 while switch 15 is open and thereafter switch 15 is closed for a predetermined time interval to update the analog signal level across the capacitor 18. The configuration and operation of this technique for plotting successive points on a graph may be similar to that described in more detail in U.S. Pat. No. 3,573,842 issued to Robert W. Colpitts on Apr. 6, 1971, and assigned to the same assignee as the present invention.

The analog signal from the filter and memory hold circuit 17 is applied through a resistor 19 to servoamplifier circuit means, hereinafter described, and thence to a servomotor 21. The servomotor 21 is mechanically linked, as shown by the dashed line 23, to a carriage 25 which moves horizontally in the X direction. The carriage 25 has mounted thereon a recording pen 27 which is movable vertically on the carriage in the Y direction. Only the mechanical linkage for X axis movement of the carriage is shown, it being understood that Y axis movement of the pen is achieved by another servomotor and control circuitry therefor which is substantially the same as the control channel described herein. The carriage 25 includes a slide wire 29 which engages a resistor 31 disposed along the X axis. Resistor 31 is connected to a source of negative reference potential $-V_R$. As the pen carriage 25 moves along the X axis, the variable potentiometer formed by wiper arm 29 and resistor 31 provides a negative position feedback signal through a resistor 33 to the input of the servoamplifier circuit means.

The servoamplifier circuit means includes an operational amplifier circuit 32 which has an input for receiving the sum of the analog pen control signal through resistor 19 and the pen position feedback signal through resistor 33. The output signal $V_1$ from the summing amplifier circuit 32 is applied through a resistor 34 to a first amplifier 35 which has an R-C network 37 in a negative feedback loop between its output and input terminals. The feedback signal provided by the R-C network 37 operates to compensate for the characteristics of the motor in the servoloop, thereby to decrease the system response time. The output signal from amplifier 35 is coupled through a resistor 39 to an operational amplifier circuit 41 and thence to the servomotor 21.

A feature of the present invention is that the servoamplifier circuit means includes a second amplifier 43 coupled in parallel with the first amplifier 35. The second amplifier 43 receives the signal $V_1$ through a resistor 45. Amplifier 43 is a high gain amplifier having its output and input terminals coupled by a negative feedback circuit including a resistor 47 and two series coupled oppositely poled Zener diodes 49, 51. Resistor 47 serves to prevent oscillations in the servoloop when a null point is reached. Amplifier 43 with its feedback circuit operates essentially as a threshold detector and responds to any analog signal output $V_1$ which is greater than a predetermined low value, on the order of 0.05 volt. Assuming that the signal $V_1$ is positive, amplifier 43 and its feedback circuit switch into an operating state such that Zener diode 49 conducts in the forward direction as a diode with a few tenths of a volt drop across it, and Zener diode 51 conducts to maintain its Zener breakdown voltage thereacross. As a result, a constant level voltage signal is produced at the output of amplifier 43. This constant level signal is conducted through a variable potentiometer 53, and the resulting signal $V_2$ is combined with the signal $V_1$ conducted through resistor 39. The operational amplifier 41 serves to sum these two signals so that the output signal $V_1 + V_2$ is applied to the servomotor 21. The constant level signal component $V_2$ of the combined signal serves to energize servomotor 21 sufficiently to overcome frictional forces, as described hereinafter. In the event that the analog signal $V_1$ from the operational amplifier circuit 32 is a negative signal, the operation of amplifier 43 and its associated feedback circuit is similar to that described above except that Zener diode 51 conducts in the forward direction as a diode and Zener diode 49 conducts in the reverse direction at its breakdown voltage.

The operational features and advantages of the above-described parallel connected first and second amplifiers 35, 43 may best be understood with reference to FIGS. 2–5. FIGS. 2 and 3 illustrate the manner in which a curve is drawn by a typical prior art graphical recorder. FIG. 2 shows how a sine wave would be drawn and then retraced. The curve is drawn in a positive direction along the X axis from a starting point S to an ending point E. Thereafter, when the curve is retraced in a negative direction along the X axis, the end point E becomes a new starting point S′, and the retrace operation continues until the final ending point E′ is reached. Ideally, there should be complete coincidence between the initial trace and the retrace curve. However, as shown, there is a slight displacement between the two curves. This displacement is typically on the order of 0.025 inch and is due to the deadband in the servosystem. More specifically, the pen does not begin moving until the voltage applied to the servomotor by the servoamplifier circuit reaches a level sufficient to overcome the frictional forces of the servomotor and the pen carriage mechanically linked thereto.

The effect of the deadband can be seen in more detail by the reference to FIGS. 3a and b. FIG. 3a illustrates the analog voltage applied to the servomotor for one of the X and Y axes as a function of time when the pen is started from a rest point to begin tracing a curve. FIG. 3b illustrates the actual velocity v of the pen along the same axis as a function of time corresponding to the time in FIG. 3a. By comparing FIGS. 3a and 3b, it can be seen that the pen does not begin moving until the voltage input to the servomotor rises to a level sufficient to overcome the frictional forces as described above. This occurs after a time interval $t_D$. The voltage increment corresponding to this time is the deadband. The waveform produced up to time $t_1$ corresponds to acceleration of the pen, and the shape of the waveform is due to the well-known compensating effects of the servoloop. After time $t_1$, the pen slews at a constant velocity. Although it is not shown in FIG. 3a, when the pen reaches the end point of the curve, the servomotor voltage becomes zero due to operation of the position feedback servoloop circuit. Thus, with each new line segment or curve drawn, there is a new increasing voltage signal and a consequent deadband.

The operation of the system of the present invention is shown in FIGS. 4 and 5 and is different from the typical prior art system described above in connection with FIGS. 2 and 3. As shown in FIG. 4, there is substantially complete coincidence between the initial trace of the sine wave and the retrace in the opposite direction. The ending point E of the initial trace coincides with the starting point S′ of the retrace. FIG. 5a illustrates the analog signal voltage applied to servomotor 21 in FIG. 1 to move the pen between any two points along the sine wave shown in FIG. 4. The signal in FIG. 5a is a composite of two components, namely, the voltage $V_1$ derived from amplifier 31 and the voltage $V_2$ which is the constant level signal derived from the second amplifier 43. FIG. 5b illustrates the pen velocity v as a function of the corresponding time shown in FIG. 5a. It can be seen that the pen begins moving almost immediately upon occurrence of the analog pen control signal at the beginning of a trace. This is because the constant level component $V_2$ of the servomotor drive signal is produced as soon as a pen control signal is supplied at the output of summing amplifier 32. The voltage $V_2$ is adjusted by the variable potentiometer 53 to a level sufficient to overcome the initial forces of friction within the servomotor 21 and its associated linkages. Consequently, the time required for pen movement to begin is minimized and there is substantially no deadband.

During the time period up to time $t_1$ in FIGS. 5a and 5b, the pen is accelerating. Between times $t_1$ and $t_2$, the pen is driven at constant velocity by the combined voltage ($V_1 + V_2$) applied to the servomotor 21. The waveforms between times $t_2$ and $t_3$ correspond to servocontrol of pen deceleration. As shown, the servomotor voltage goes to zero as the pen approaches the coordinate position represented by the analog input signal at point B in the circuit of FIG. 1. Each time the pen begins movement from a rest position to a new coordinate position defined by vector generator 11, the voltage initially applied to servomotor 21 is switched to the magnitude $V_2$, thereby insuring minimum deadband for each line segment or curve drawn.

I claim:

1. In an X-Y plotter including a positionable writing stylus; a servomotor for moving said stylus; servoamplifier means having an input for receiving an analog stylus control signal from an external source and for driving said servomotor in response to said control signals; and means responsive to the position of said writing stylus for providing a position feedback signal to the input of said servoamplifier means, the improvement wherein said servoamplifier means comprises:

first amplifier means for providing a first output signal proportional to the signal at said input;

second amplifier means coupled in parallel with said first amplifier means and operative in response to a predetermined signal level at said input for providing a second constant level output signal having a predetermined magnitude selected to drive said servomotor to overcome frictional forces in said servomotor.

2. The apparatus of claim 1, wherein said second amplifier means includes an operational amplifier having input and output terminals and a pair of oppositely poled asymmetrically conducting elements coupled in series in a feedback loop between said last named output and input terminals.

3. The apparatus of claim 2, wherein said asymmetrically conducting elements are Zener diodes.

4. The apparatus of claim 2, further including means coupled to the output of said second amplifier means for adjusting the magnitude of said constant level output signal.

5. The apparatus of claim 1, further including means coupled to said first and second amplifier means for summing said first and second output signals therefrom, said summing means having an output coupled to said servomotor.

6. The apparatus of claim 5, wherein said summing means includes an operational amplifier.

7. The apparatus of claim 1, wherein said servoamplifier means further includes operational amplifier means for coupling the signals at said input to said first and second amplifier means.

* * * * *